United States Patent [19]

Kamath et al.

[11] Patent Number: 4,927,891

[45] Date of Patent: May 22, 1990

[54] POLYMER BOUND LIGHT STABILIZER COATING RESINS

[75] Inventors: Vasanth R. Kamath, Amherst; James D. Sargent, Cheektowaga, both of N.Y.

[73] Assignee: Pennwalt Corporation, Philadelphia, Pa.

[21] Appl. No.: 275,452

[22] Filed: Nov. 23, 1988

[51] Int. Cl.$^5$ .............................................. C08F 8/30
[52] U.S. Cl. .............................. 525/327.3; 525/327.6; 525/328.2; 525/328.8; 525/375; 525/376; 524/548; 524/555; 524/558
[58] Field of Search ............... 525/327.3, 327.6, 328.2, 525/328.8; 524/548, 555, 558

[56] References Cited

U.S. PATENT DOCUMENTS

| | | |
|---|---|---|
| 3,956,269 | 5/1976 | Sheppard et al. . |
| 4,042,773 | 8/1977 | Sheppard et al. . |
| 4,210,612 | 7/1980 | Karrer . |
| 4,294,949 | 10/1981 | Karrer . |
| 4,495,325 | 1/1985 | DeBergalis et al. . |
| 4,785,063 | 11/1988 | Slongo et al. . |

OTHER PUBLICATIONS

M. Dexter et al., "Light and Heat Stabilizers for Coatings," *Handbook of Coating Additives*, pp. 225–269, (1987).

*Primary Examiner*—Bernard Lipman
*Attorney, Agent, or Firm*—Panitch Schwarze Jacobs & Nadel

[57] ABSTRACT

Acrylic coating resins with attached light stabilizer functional groups are provided.

The polymer bound light stabilizer coating resins are prepared by reacting light stabilizer hydrazides, LS—C(=O)—NR$^3$—NH$_2$, with an acrylic prepolymer containing at least two different types of reactive functional groups, one of which is a hydroxyalkyl ester group and the other is carboxyl, anhydride, epoxy or isocyanate. LS is a light stabilizer moiety, and R$^3$ is hydrogen, primary alkyl of 1 to 8 carbons, secondary alkyl of 3 to 8 carbons, aralkyl of 7 to 12 carbons or cycloalkyl of 5 to 12 carbons. The reaction may be carried out in an inert solvent or in the bulk state.

The acrylic resins so produced with chemically bound light stabilizer groups are particularly useful in the stabilization of coatings. Enamel or lacquer coatings containing the polymer bound light stabilizer regins exhibit outstanding weatherability and durability. As a result of being chemically bound, the light stabilizers are resistant to loss due to volatility and extractability during typical coatings bake operations and exposure to the elements of weather.

9 Claims, No Drawings

POLYMER BOUND LIGHT STABILIZER COATING RESINS

BACKGROUND OF THE INVENTION

1. Field of the Invention

This invention relates to coating resins with attached light stabilizer functional groups. More particularly, it relates to acrylic resins suitable for coating applications which contain ultraviolet light absorbing (UVA) stabilizers and/or hindered amine light stabilizers (HALS) chemically bound to the acrylic resin.

This invention provides novel acrylic resins with chemically attached light stabilizing groups, wherein improved light stabilizer performance has been obtained by means of binding the light stabilizer group to the acrylic resin.

This invention further relates to the use of these acrylic resins with chemically bound light stabilizer groups in coating compositions for the stabilization of the coating against thermal and/or photooxidative degradation.

This invention provides a cost effective method of improving the durability and weatherability of coatings, and provides improved product economics over prior art light stabilization methods for coatings.

2. Description of the Prior Art

Synthetic polymers, including organic coatings and films, are sensitive to and degraded by the deleterious effects of weather components such as heat, sunlight, and moisture. Light and heat stabilizers such as ultraviolet light absorbing (UVA) stabilizers and hindered amine light stabilizers (HALS) are used to inhibit such deterioration.

Ultraviolet light absorbing stabilizers act by absorbing the harmful UV light energy of sunlight and converting it into thermal energy at low enough levels that the heat is much less deleterious than the radiation. Representative UVA stabilizers include derivatives of 2-hydroxybenzophenones, 2-(2-hydroxyphenyl)benzotriazoles, and the oxalanilides, for example.

Hindered amine light stabilizers (HALS) derived from 2,2,6,6-tetraalkylpiperidine compounds do not absorb ultraviolet light, but stabilize by reacting with radicals formed from degradative processes, thus preventing harmful side reactions, such as scission or crosslinking, as well as autooxidation. The mechanism(s) of action for hindered amine light stabilizers are not fully understood. The literature cites not only radical scavenging as a stabilizing mechanism, but also singlet oxygen quenching, and hydroperoxide decomposition.

A thorough description of ultraviolet absorbing and hindered amine light stabilizer chemistry as it pertains to coatings applications can be found in the Handbook of Coatings Additives; "Light and Heat Stabilizers for Coatings"; Dexter, M. and Schirmann, P. J., Marcel Dekker, Inc., 1987, pp. 225-269.

In addition to activity as a stabilizer, useful light stabilizers for coatings must have both compatibility with and/or solubility in the polymer and/or coating composition to be stabilized. Useful light stabilizers must also possess resistance to loss from the stabilized composition during normal processing and end-use applications. Many light stabilizers exhibit limited compatibility and/or solubility in certain polymers and coatings, and a tendency to exude, sublime and/or volatilize during weathering or exposure to elevated temperatures (all examples of fugitive characteristics), such as those employed in typical enamel cure systems.

One approach to overcoming the problems of fugitive stabilizers associated with compatibility, solubility, volatility, extractability, and migration of the light stabilizer has been to chemically bind the light stabilizer moiety to the polymer and/or the coating to be stabilized.

Methods disclosed in the art to prepare polymers with chemically bound light stabilizer group(s) include: (1) monomeric light stabilizers which can be polymerized or copolymerized (see U.S. Pat. Nos. 4,210,612 and 4,294,949); and (2) free radical initiators (peroxide and azonitrile compounds) containing light stabilizer functionality which can be used to impart the light stabilizer group to the polymer by free radical polymerization techniques (see U.S. Pat. Nos. 3,956,269 and 4,042,773; and U.S. patent application Ser. No. 87,473 filed Aug. 20, 1987, now U.S. Pat. No. 4,822,883 assigned to the assignee of the present invention and application).

Both methods have their drawbacks.

The monomeric light stabilizers are often difficult to prepare. In the case of the monomeric HALS, the polymerization or copolymerization has to be run under specific conditions in order to prevent oxidation of the hindered amine. Poor polymer conversion is often another limitation with the use of monomeric light stabilizers. This results in high levels of residual monomer which sacrifices product economics and quality. Moreover, in some cases the reactivity of the monomeric light stabilizers with other co-monomers is low, resulting in non-homogeneous distribution of the light stabilizer group along the polymer backbone.

In general, the effectiveness of the light stabilizer to protect the polymer and/or coating is dependent on the uniform distribution of the light stabilizer moiety throughout the polymer and/or coating.

Numerous types of light stabilizing compounds incorporated into free radical initiators are known in the prior art, for example, organic peroxide and azonitrile compounds containing hydroxybenzophenone, benzotriazole, and HALS functionalities. One problem with incorporating light stabilizers into polymerization initiators, such as peroxy and azo compounds, is that this approach limits the effective level of stabilizer that can be bound to the polymer at useful molecular weight production. The ability to adjust the concentration of the stabilizer bound to the polymer without adversely affecting the polymer molecular weight, as well as the molecular weight distribution is severely limited with the use of light stabilizer initiators. Moreover, azonitrile initiators in general possess low kinetic efficiencies, as low as 25%, thus limiting the percentage of light stabilizer that is chemically attached to the polymer. Further, in free radical polymerization, the light stabilizer group derived from the initiator is bound pendantly to the end(s) of the polymer chains. As a consequence, the distribution of the light stabilizer moiety on the polymer is non-homogeneous.

Another method of preparing polymer bound stabilizers is to attach the stabilizer group(s) to polymers which contain reactive functionalities. This method allows more efficient control over the stabilizer concentration, since the stabilizer is bound directly to the polymer or copolymer. In addition, homogeneous distribution of the light stabilizer throughout the polymer can be effectively controlled by the uniformity of the reactive functionalities along the polymer backbone.

U.S. Pat. No. 4,495,325 discloses ultraviolet light absorbing stabilizers containing hydroxyl functionality (such as resorcinol monobenzoate and dihydroxybenzophenone) which are chemically bound into an acrylic copolymer through glycidyl methacrylate.

U.S. Pat. No. 4,857,595 and U.S. patent application Ser. No. 84,608, filed Aug. 12, 1987 now U.S. Pat. No. 4,868,246 and both assigned to the assignee of the present invention and application, disclose hydrazide functionalized light stabilizers, both UVA and HALS hydrazides, which are chemically bound into polymers or copolymers through reactive anhydride groups contained along the polymer backbone. However, these applications do not disclose or teach the reaction of hydrazide with polymers containing hydroxyalkyl ester, carboxyl, epoxy, or isocyanate functionalities. Further, these prior applications do not reveal the use of two or more different functional groups on the polymer or copolymer. Moreover, the use of anhydride containing polymers would not be suitable for thermoset (enamel) coating applications. Hydroxyl functionality on the acrylic polymer is necessary to effect cure with conventional crosslinking cure agents such as melamine or isocyanate compounds.

Although various means are known in the art to attach light stabilizers to polymers, the use of light stabilizer hydrazides for producing polymer bound light stabilizer coating resins has not been disclosed.

The present invention overcomes the problems and limitations of the prior art.

SUMMARY OF THE INVENTION

The present invention is directed to acrylic coating resins containing chemically bound light stabilizers. This invention involves the preparation of acrylic bound ultraviolet light absorbing stabilizers (UVA) and acrylic bound hindered amine light stabilizers (HALS) coating resins. In addition, it involves the use of such acrylic bound light stabilizer resins in coating compositions.

One aspect of the present invention is a light stabilized acrylic resin for use in acrylic lacquer or acrylic enamel coatings comprising an acrylic prepolymer having at least first and second different types of reactive functional groups, the first type of reactive functional group being a hydroxyalkyl ester group, the second type of reactive group being one or more of a carboxyl group, an anhydride group, an epoxy group or an isocyanate group, the acrylic resin further comprising a light stabilizer group chemically bound to the acrylic prepolymer.

As used herein, the term "hydroxyalkyl ester group" means a hydroxyalkyl ester group wherein the alkyl portion of the group is unsubstituted or substituted alkyl of 2 to 8 carbons, where the substituents are alkyl of 1 to 4 carbons, alkoxy of 1 to 4 carbons, chloro or hydroxyl.

Another aspect of the present invention is a light stabilized acrylic resin comprising the reaction product of an acrylic prepolymer having at least first and second types of reactive functional groups, the first type of reactive functional group being a hydroxyalkyl ester group, the second type of reactive group being a carboxyl group, an anhydride group, an epoxy group or an isocyanate group, and a light stabilizer having a reactive hydrazido group.

More particularly, the light stabilizer groups include a hydrazido functional group and are chemically bound to at least one reactive functional group of the acrylic prepolymer through a hydrazido functional linkage.

DETAILED DESCRIPTION OF THE PREFERRED EMBODIMENTS

This invention provides novel acrylic resins with chemically attached light stabilizing groups, wherein improved light stabilizer performance has been obtained by means of binding the light stabilizer group to the acrylic resin.

Light stabilized acrylic polymers of the present invention provide improvements over the prior art in terms of light stabilizer efficiency, solubility, compatibility, and permanence in coatings. Thus, the stabilizers are non-fugitive.

This invention provides a cost effective method of improving the durability and weatherability of coatings and provides improved product economics over prior art light stabilization methods for coatings.

We have found that by reacting light stabilizer hydrazides with acrylic polymers containing at least two different types of functional groups, the first type being hydroxyalkyl ester and the second type being carboxyl, anhydride, epoxy, or isocyanate, provides a convenient and effective method of producing polymer bound light stabilizer coating resins.

The process of the instant invention provides improvements over the current light stabilization art for coatings. Use of the polymer bound light stabilizer acrylic resins of this invention in compositions for lacquer and enamel films and coatings results in outstanding film and coatings properties. Gloss and color retention of the coating, as well as crack prevention, upon exposure of the coating to the harmful elements of weather are excellent.

This invention provides improved product economics by offering a means to use less stabilizer as compared to exisiting commercial light stabilizers while also improving the weatherability of the coatings. As a result of being chemically bound to the polymer, the stabilizers are rendered non-volatile and non-extractable, and thus have non-fugitive characteristics. This translates to longer service life for the coating in exterior end-use applications.

In the practice of this invention, an acrylic prepolymer suitable for coating applications is reacted with a light stabilizer which contains a hydrazide functional group. The light stabilizer hydrazide attaches to the acrylic prepolymer to form a polymer bound light stabilizer acrylic resin.

LIGHT STABILIZER HYDRAZIDES

The light stabilizer hydrazides (LS—C(=)—NR$^3$—NH$_2$) useful for the present invention, in which LS is the light stabilizer group and R$^3$ is defined hereinafter, include the following classes of light stabilizers:

(1) hindered amine light stabilizers (HALS);
(2) 2-hydroxybenzophenones;
(3) 2-(2-hydroxyphenyl)-2H-benzotriazoles;
(4) aryl salicylates; and
(5) oxalanilides.

The presently most preferred class of light stabilizer hydrazides useful for the present invention are the HALS hydrazides. The presently most preferred light stabilizer hydrazide useful for the present invention is N-(2,2,6,6-tetramethyl-4-piperidinyl)-N'-aminooxamide.

The formulas and non-limiting illustrative examples of light stabilizer hydrazides used in the present invention are as follows:

(1) HALS HYDRAZIDES

A compound of the formula:

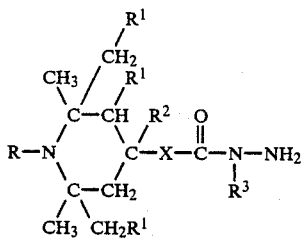

wherein:

R is hydrogen, oxyl, hydroxyl, alkyl of 1 to 20 carbons, alkenyl of 3 to 8 carbons, alkynyl of 3 to 8 carbons, aralkyl of 7 to 12 carbons, aliphatic acyl of 1 to 10 carbons, aromatic acyl of 7 to 13 carbons, alkoxycarbonyl of 2 to 9 carbons, aryloxycarbonyl of 7 to 15 carbons, alkyl carbamoyl of 2 to 19 carbons, aryl carbamoyl of 7 to 11 carbons, cycloalkyl carbamoyl of 6 to 13 carbons, aralkyl carbamoyl of 8 to 19 carbons, 2-cyanoethyl, hydroxyalkyl of 1 to 6 carbons, epoxyalkyl of 3 to 10 carbons or polyalkylene oxide of 4 to 30 carbons;

$R^1$ is hydrogen or lower alkyl of 1 to 4 carbons;

$R^2$ is hydrogen, hydroxyl, or alkoxy of 1 to 4 carbons; when $R^2$ is hydrogen, X is a divalent radical —Z—$R^4$—, —$R^4$— or —Z—C(=O)—$R^5$—, and Z is —O— or —N($R^6$)—;

when $R^2$ is hydroxyl or alkoxy, X is a direct bond or an alkylene diradical of 1 to 4 carbons;

$R^3$ is hydrogen, primary alkyl of 1 to 8 carbons, secondary alkyl of 3 to 8 carbons, aralkyl of 7 to 12 carbons or cycloalkyl of 5 to 12 carbons;

$R^4$ is an alkylene diradical of 1 to 4 carbons;

$R^5$ is a direct bond, an alkylene diradical of 1 to 14 carbons, an alkenylene diradical of 2 to 10 carbons, an oxydialkylene diradical of 2 to 10 carbons, an azadialkylene diradical of 2 to 10 carbons, an o-, m-, p-phenylene diradical or a substituted phenylene diradical where the substituent is lower alkyl of 1 to 4 carbons, lower alkoxy of 1 to 4 carbons or hydroxy; and $R^6$ is hydrogen, alkyl of 1 to 10 carbons, cycloalkyl of 5 to 10 carbons, aralkyl of 7 to 12 carbons, aryl of 6 to 12 carbons, 2-cyanoethyl or a radical of the formula:

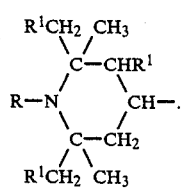

Non-limiting examples of HALS hydrazides useful for the present invention include the following:
N-(2,2,6,6-tetramethyl-4-piperidinyl)-N'-aminooxamide;
N-(1,2,2,6,6-pentamethyl-4-piperidinyl)-N'-aminooxamide;
N-(1-acetyl-2,2,6,6-tetramethyl-4-piperidinyl)-N'-aminooxamide;
3-(2,2,6,6-tetramethyl-4-piperidinylamino)propionhydrazide;
(2,2,6,6-tetramethyl-4-piperidinylamino)acetyl hydrazide; and
2-methyl-3-(2,2,6,6-tetramethyl-4-piperidinylamino)-propionhydrazide.

(2) 2-HYDROXYBENZOPHENONE HYDRAZIDES

A compound of the formula:

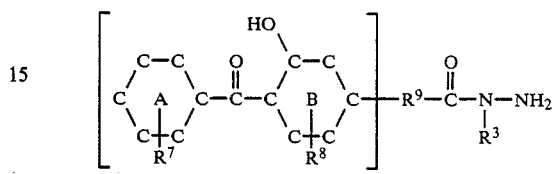

wherein:

$R^3$ is as previously defined;

$R^7$ and $R^8$ independently are hydrogen, hydroxyl, alkyl of 1 to 8 carbons or alkoxy of 1 to 4 carbons;

$R^9$ is a direct bond or a divalent radical —O—(CH$_2$)$_b$— or —N($R^{10}$)—C(=O)—$R^5$—, in which $R^5$ is as previously defined and b is 1 or 2, where $R^9$ may be connected to either aromatic ring A or B; and $R^{10}$ is hydrogen, alkyl of 1 to 10 carbons, aralkyl of 7 to 12 carbons, cycloalkyl of 5 to 12 carbons or 2-cyanoethyl;

with optional substituents for the aromatic rings A and B comprising one or more of hydroxyl, alkyl of 1 to 8 carbons or alkoxy of 1 to 4 carbons.

Non-limiting examples of 2-hydroxybenzophenone hydrazides useful for the present invention include the following:
(4-benzoyl-3-hydroxyphenoxy)acetyl hydrazide;
(4-(2-hydroxybenzoyl)-3-hydroxyphenoxy)acetyl hydrazide;
(4-(4-methoxybenzoyl)-3-hydroxyphenoxy)acetyl hydrazide;
2-(2',4'-dihydroxybenzoyl)benzoic acid hydrazide; and
2-(2'-hydroxy-4'-methoxybenzoyl)benzoic acid hydrazide.

(3) 2-(2-HYDROXYPHENYL)-2H-BENZOTRIAZOLE HYDRAZIDES

A compound of the formula:

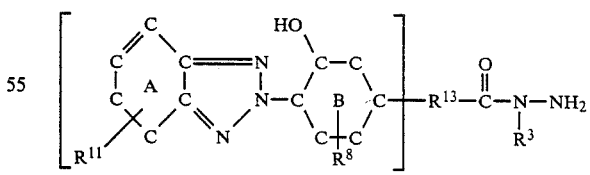

wherein:

$R^3$ is as previously defined;

$R^{11}$ is hydrogen, chloro, alkyl of 1 to 4 carbons, alkoxy of 1 to 4 carbons, carboxyl, alkoxycarbonyl of 2 to 11 carbons or carboxylic acid amide;

$R^{12}$ is hydrogen, alkyl of 1 to 8 carbons, aralkyl of 7 to 12 carbons or aryl of 6 to 14 carbons; and $R^{13}$ is a direct bond or a divalent radical —(CH$_2$)—N-H—C(=O)—$R^5$—, —(CH$_2$)—NH—(CH$_2$)$_b$—, —(CH$_2$-

)$_b$—, or —O—(CH$_2$)$_b$—, in which R$^5$ is as previously defined and b is 1 or 2, where R$^{13}$ may be connected to either aromatic ring A or B;

with optional substituents for aromatic rings A and B comprising alkyl of 1 to 8 carbons, aralkyl of 7 to 12 carbons or alkoxy of 1 to 8 carbons.

Non-limiting examples of 2-(2-hydroxyphenyl)-2H-benzotriazole hydrazides useful for the present invention include the following:
3-(3-[2H-benzotriazol-2-yl]-4-hydroxy-5-t-butylphenyl)propionhydrazide;
3-(3-[2H-benzotriazol-2-yl]-4-hydroxy-5-methylphenyl)propionhydrazide;
3-(3-[2H-benzotriazol-2-yl]-2,6-dihydroxyphenyl)propionhydrazide;
(4-[2H-benzotriazol-2-yl]-3-hydroxyphenoxy)acetyl hydrazide;
(4-[5-methoxy-2H-benzotriazol-2-yl]-3-hydroxyphenoxy)acetyl hydrazide; and
3-(2H-benzotriazol-2-yl)-4-hydroxybenzoic acid hydrazide.

(4) HYDRAZIDO SUBSTITUTED SALICYLATE ESTERS

A Compound of the formula:

$$H_2N-N(R^3)-C(=O)-R^{15}-\text{[aromatic ring with OH and C(=O)-O-R^{14}]}$$

wherein:

R$^3$ is as previously defined;

R$^{14}$ is aryl or substituted aryl of 6 to 10 carbons, where the substituents are lower alkyl of 1 to 4 carbons, lower alkoxy of 1 to 4 carbons or hydroxy; and R$^{15}$ is a direct bond, an alkylene diradical of 1 to 4 carbons, or a divalent radical —R$^5$—C(=O)—NH— or —(CH$_2$)$_b$—Z—, in which R$^5$ and Z are as previously defined and b is 1 or 2.

Non-limiting examples of hydrazido substituted salicylate esters useful for the present invention include the following: N-(3-hydroxy-4-[phenoxycarbonyl]phenyl)-N'-aminooxamide; N-(3-hydroxy-4-[4-t-butylphenoxycarbonyl]phenyl)-N'-aminooxamide; and 3-(3-hydroxy-4-[4-methylphenoxycarbonyl]phenoxy)propionhydrazide.

(5) OXALANILIDE HYDRAZIDES

A compound of the formula:

$$\text{[phenyl]}-NH-C(=O)-C(=O)-NH-\text{[phenyl with R^{15} and H_2N-N(R^3)-C=O substituent]}$$

wherein:

R$^3$ and R$^{15}$ are as previously defined;

with optional substituents for the aromatic nuclei independently being hydroxyl, alkyl of 1 to 8 carbons, aralkyl of 7 to 13 carbons, aryl of 6 to 12 carbons, alkaryl of 7 to 13 carbons, alkoxy of 1 to 12 carbons, acyloxy of 2 to 12 carbons or alkoxycarbonyl of 2 to 8 carbons.

Non-limiting examples of oxalanilide hydrazides useful for the present invention include the following: 4-(N'-[2-methoxyphenyl]-oxamido)benzoyl hydrazide; and 2-(2-[N'-phenyloxamido]phenoxy)acetyl hydrazide.

ACRYLIC PREPOLYMERS

Acrylic prepolymers or precopolymers (hereinafter, both prepolymers and precopolymers will be referred to as "prepolymers") suitable for coatings applications, in both lacquer and enamel compositions, typically comprise polymerized monomers of alkyl acrylate and/or alkyl methacrylate, hydroxyalkyl acrylate and/or hydroxyalkyl methacrylate, acrylic acid and/or methacrylic acid, and the like.

Acrylic enamel coating resins must contain chemically active groups, usually hydroxyl functionality, in order to undergo molecular weight buildup and network formation during the final curing or crosslinking reaction where compounds such as melamine formaldehyde or isocyanates are used as the curing agents. To prepare a prepolymer with the desired hydroxyl content suitable for use in enamel formulations, a sufficient amount of hydroxyalkyl acrylate and/or hydroxyalkyl methacrylate is used, normally, about 15% to about 40% by weight of the prepolymer mixture.

In the practice of this invention, the acrylic prepolymers must contain hydroxyalkyl ester functionality. The acrylic prepolymers must also contain, in addition to the hydroxyalkyl ester group, at least one other functional group selected from carboxyl, anhydride, epoxy, or isocyanate.

Useful prepolymers suitable for the present invention comprise the polymerized monomers: (a) about 10% to about 80% by weight unbranched or branched alkyl acrylate and/or alkyl methacrylate or mixtures thereof, wherein the alkyl group is an unsubstituted or substituted alkyl of 1 to 18 carbons, where the substituents are alkoxy of 1 to 4 carbons, chloro, phenyl or dialkylamino of 2 to 4 carbons, (b) about 15% to about 50% by weight hydroxyalkyl acrylate and/or hydroxyalkyl methacrylate, wherein the alkyl portion of the hydroxyalkyl group is unsubstituted or substituted alkyl of 2 to 8 carbons, where the substituents are alkyl of 1 to 4 carbons, alkoxy of 1 to 4 carbons, chloro or hydroxyl, (c) about 0% to about 50% by weight styrene, and (d) about 0% to about 10% by weight of any of acrylic acid, methacrylic acid, maleic anhydride, 5-norbornene-2,3-dicarboxylic anhydride, glycidyl acrylate, glycidyl methacrylate, isocyanatoethyl acrylate, or isocyanatoethyl methacrylate, or mixtures thereof.

One preferred acrylic prepolymer suitable for the present invention contains about 30% by weight n-butyl acrylate (BA), about 20% by weight n-butyl methacrylate (BMA), about 25% by weight 2-hydroxyethyl acrylate (HEA), about 10% by weight methyl methacrylate (MMA), about 10% by weight styrene (STY) and about 5% by weight maleic anhydride (MAH).

Another preferred acrylic resin contains about 40% BA, about 25% BMA, about 25% HEA, about 7.5% STY and about 2.5% MAH. Unless otherwise stated all percentages are by weight of the prepolymer composition.

Yet another preferred acrylic resin contains about 30% BA, about 20% BMA, about 25% HEA, about 10% MMA, about 10% STY and about 5% methacrylic acid (MAA).

Further, acrylic prepolymers containing about 30% BA, about 20% BMA, about 25% HEA, about 10% MMA, about 10% STY and about 5% glycidyl methacrylate (GMA) and/or isocyanatoethyl methacrylate (IEMA) and/or 5-norbornene-2,3-dicarboxylic anhydride (NAH) would also be useful for the present invention.

In addition, the acrylic prepolymers can also optionally contain other functional monomers designed for specific end uses. Non-limiting examples include isobutyl methacrylate, vinyl acetate, acrylonitrile, ethyl 2-cyanoacrylate, 2-diethylaminoethyl methacrylate, isobornyl methacrylate, acetoacetoxyethyl methacrylate, and the like.

It is preferred that the prepolymer solution have a solids content on the order of about 50% by weight or greater in an inert hydrocarbon solvent and a number-average molecular weight on the order of about 10,000 or less for enamel coating applications, and greater than 10,000 for lacquer coating applications, typically on the order of 25,000 or greater for lacquer coating resins.

POLYMER BOUND LIGHT STABILIZER COATING RESIN

The polymer bound light stabilizer coating resins are prepared by reacting light stabilizers containing reactive hydrazide functionality with acrylic prepolymers containing at least two functional groups, one of which is hydroxyalkyl ester, the other being carboxyl, anhydride, epoxy, or isocyanate.

In the practice of this invention, the reaction of one or more light stabilizer hydrazides with acrylic prepolymers containing the two different types of reactive groups is carried out in organic solvents or in the bulk state (i.e., no solvent).

In the practice of this invention, inert non-oxygenated hydrocarbon solvents are preferred. Certain ketone, acetate and ester solvents typically used to prepare acrylic polymers intended for coatings can react with the light stabilizer hydrazides of the present invention, thereby limiting their degree of binding to the acrylic polymers. Accordingly, such reactive solvents should not be used to make the light stabilized acrylic resins of the present invention.

Examples of inert solvents which are used to prepare polymers useful for the present invention include toluene, xylene, mineral spirits, and other aliphatic, cycloaliphatic, and aromatic hydrocarbons.

In addition, we have found that certain ether-ester solvents, such as ethyl 3-ethoxypropionate, can also be used in the practice of this invention without adversely effecting the degree of light stabilizer binding.

In general, solvents or mixtures of solvents that do not have an adverse effect on binding efficiency can be used.

The presently most preferred inert solvents for use in the present invention possess both high solvency and high boiling point, such as Aromatic 100 and Aromatic 150 from Exxon Chemicals.

Acrylic resins suitable for coating applications are typically prepared by solution polymerization in which select monomers and polymerization initiator(s), alone or in combination, are added at a given rate to organic solvent at refluxing temperature and/or the desired polymerization temperature.

The reaction of one or more light stabilizer hydrazides with acrylic prepolymers containing the two different types of reactive groups is conducted at temperatures on the order of about 30° C. to about 170° C. for times varying from about 30 seconds to about 8 hours.

Preferably, the light stabilizer attachment to acrylic resin is carried out at temperatures of about 100° C. to about 150° C. for about 15 minutes to about 4 hours.

The lowest reaction temperature and shortest time duration to attain a final reaction product having low solution color (APHA color of 100 or less based on ASTM standard method D1209-69, test method for color of clear liquids (platinum-cobalt scale)) and a high degree of light stabilizer binding (greater than 75%) are preferred. A reaction temperature on the order of about 120° C. to about 145° C. for about 15 to about 120 minutes has been found to result in desirable reaction products having low color and high binding efficiency.

The degree of light stabilizer binding or attachment to the acrylic prepolymer is monitored during the course of the reaction by the level of unreacted or residual hydrazide remaining. This is determined by reverse phase liquid chromatography (RPLC). Refer to the Analytical Methods set forth hereinafter for a detailed description.

The light stabilizer hydrazide concentration used in the practice of this invention is in the range of about 0.0 to about 20 parts by weight per 100 parts by weight of the prepolymer, and preferably, about 0.10 to about 10 parts by weight light stabilizer hydrazide per 100 parts by weight of prepolymer. The concentration of the light stabilizer hydrazide is based on addition of the light stabilizer hydrazide to acrylic prepolymer by weight. For example, 2 parts (grams, pounds, etc.) are added to 100 parts of acrylic prepolymer and then reacted to form the polymer bound light stabilizer coating resin. It is presently preferable to use about 0.50 to about 5.0 parts by weight of the light stabilizer group per 100 parts by weight of acrylic prepolymer.

The desired light stabilizer hydrazide concentration used will depend on the concentration of reactive functional groups on the acrylic prepolymer.

Coatings Compositions Containing Light Stabilized Acrylic Resins

There are two basic types of films or coatings: lacquers and enamels. Lacquers cure simply by drying or solvent evaporation to form the resin film. An enamel, in contrast, involves crosslinking in the cure, wherein separate crosslinking or cure agents are added which react with functional groups on the resin to form the films or coating. The light stabilized acrylic resins of the present invention are useful in both lacquer coatings and enamel coatings. Various types and formulations of enamel and lacquer acrylic coating compositions are well known to those of ordinary skill in the art.

Thermoset acrylic coating enamel compositions typically comprise (1) one or more acrylic resins containing one or more reactive functional groups such as hydroxyl and/or carboxyl; (2) a crosslinker or cure agent; (3) an optional cure catalyst; and (4) an organic solvents or mixture of various suitable organic solvents.

A conventional enamel coating can be made by blending about 40 to about 80 parts acrylic resin (e.g. acrylic polyol); about 20 to about 60 parts crosslinking agent (e.g. hexamethoxymethylmelamine and/or the biuret of hexamethylene diisocyanate); about 0.10 to about 10 parts cure catalyst (e.g. p-toluenesulfonic acid); and about 20 to about 200 parts organic solvent(s).

Various additives are optionally blended in the enamel formulation for specific end use. Examples are color pigments, flow control agents, bactericides/fungicides, buffering agents, antioxidants, light stabilizers, and the like. Generally, the total solids or non-volatile matter (NVM) content of the enamel formulation is about 20% to about 80% by weight.

The thermoset enamel coatings are applied to substrate (wood, metal, plastic) in conventional manners, such as gravity drawdown, air atomizing, or electrostatic air spray, and baked for about 5 to about 60 minutes at temperatures of about 60° C. to about 200° C. to yield hard glossy films on the order of about 0.10 to about 10 mils in thickness.

In general, bake conditions employed in industrial enamel applications are on the order of about 10 to about 30 minutes at temperatures on the order of about 90° C. to about 165° C. Dry film thickness is normally on the order of about 0.50 to about 5 mils.

Lacquer films do not cure by chemical reaction to achieve the hardness and toughness required of a serviceable coating. Lacquer coatings simply dry by solvent evaporation and depend on the molecular weight of the polymer to provide the required properties.

For the practice of this invention, the acrylic resin used in the conventional coating composition (enamel or lacquer) is replaced with the polymer bound light stabilized acrylic resin of the present invention. Thus, the coating compositions of the present invention differ from conventional coating systems only in that the acrylic resin used contains chemically bound light stabilizers.

The procedures and practices generally employed in conventional industrial thermoset enamel coating applications may be used with thermoset enamel acrylic coating compositions using the light stabilized acrylic resins of the present invention. The use of the polymer bound light stabilizer acrylic resins of this invention does not necessitate any changes in formulation or application of the thermoset resin compositions in which they are used.

Coating compositions of the present invention can contain unreacted acrylic resin in addition to the polymer bound light stabilizer acrylic resin in order to adjust the final light stabilizer level in the coating desired. The acrylic resins of the present invention which contain a high concentration of polymer bound light stabilizer can be blended (diluted) with unstabilized polymer to acheive a desired concentration of light stabilizer moiety in the final film or coating composition.

In most exterior applications about 1.0% to about 5.0% by weight of the light stabilizer moiety based on the total solids contained in the coating is sufficient.

Extraneous conventional light stabilizer additives can also be used in combination with the polymer bound light stabilizers of the present invention which will act as synergists with one or more of the polymer bound stabilizer groups.

EXAMPLES

The present invention will now be described with reference to the following non-specific non-limiting examples.

In the examples, unless otherwise indicated, the following test procedures or devices were used for determining the corresponding properties:

| Property Measurement | Test Method/Device |
|---|---|
| Solids (NVM) | ASTM D1259-80. |
| Gloss (60°) | ASTM D523-85. |
| Film Hardness | Pencil Hardness |
| | ASTM D3363-80; |
| | Knoop Indention Hardness |
| | ASTM D1474-85 (Method A) |
| Film Thickness | ASTM D1005-84 (Method A); |
| | ASTM D1186-81 |
| | (Method B - Minitest 1000). |
| Weathering | ASTM D4587-86 (Practice G-53) |
| Color | CIELAB 1976 (L*, a*, b*) |
| | Pacific Scientific/ |
| | Colorguard |
| | System/05 Colorimeter |
| Appearance | Visual examination of film for smoothness; absence of pinholes, cratering, and orange peel. |

EXAMPLE 1

Anhydride containing Acrylic High solids Coating Resin

A low molecular weight, acrylic high solids coating (HSC) resin with both hydroxyl and anhydride groups was produced using the following monomers: butyl acrylate/butyl methacrylate/2-hydroxyethyl acrylate/-methyl methacrylate/styrene/maleic anhydride in weight ratios of 30/20/25/10/10/5.

The resin was prepared by free radical solution polymerization techniques. The polymerization was conducted under nitrogen in a jacketed glass reactor equipped with a stirrer, thermometer, and reflux condenser. The monomers and initiator (listed below) were combined and metered into the reactor containing solvent (listed below) at 145° C. over a five hour period at a rate of 112 grams/hour. The monomer(s) to solvent ratio used was 3 to 1 by weight. After the monomer-/initiator addition was complete, polymerization was continued for an additional hour.

The number-average molecular weight of the resin (Resin #1) produced was 2500. The solids content was 76.5% resin.

This resin was used to bind a HALS hydrazide, as set forth in Example 2.

| Example 1: Resin #1 | | |
|---|---|---|
| | | AMOUNT |
| SOLVENT: | Aromatic 100 (Exxon) | 200 g |
| MONOMERS: | BUTYL ACRYLATE | 180 g |
| | BUTYL METHACRYLATE | 120 g |
| | 2-HYDROXYETHYL ACRYLATE | 150 g |
| | METHYL METHACRYLATE | 60 g |
| | SYTRENE | 60 g |
| | MALEIC ANHYDRIDE | 30 g |
| INITIATOR: | LUPERSOL 533 M75[1] | 40 g |
| | 5.0 PHM[2] pure basis | |

[1]LUPERSOL 533 M75 is a 75% solution of ethyl 3,3-di-(t-amylperoxy)butyrate in odorless mineral spirits (OMS) sold by the Lucidol Division of Pennwalt Corporation.
[2]parts per hundred parts monomer.

EXAMPLE 2

Acrylic-Bound Hindered Amine Light Stabilizer (HALS) Resin

To 200 grams of the acrylic resin solution (Resin #1) prepared in Example 1 were added 120 grams of Aromatic 100 solvent and 3.46 grams (0.0143 moles) hindered amine light stabilizer hydrazide (HALS #2), N-(2,2,6,6-tetramethylpiperidinyl)-N'-aminooxamide. This mixture was reacted at 145° C. for two hours under nitrogen. The reaction was accomplished in a jacketed glass reactor equipped with a Dean-Stark trap, and reflux condenser.

This yielded a 50% solids resin containing 2.21% by weight HALS #2 on resin solids. The percent attachment or degree of binding was determined to be 88% by weight.

The analytical method(s) used to determine the percent HALS #2 bound to acrylic resin are outlined in the Analytical Methods section set forth hereinafter.

EXAMPLE 3

Clearcoat Enamels containing Acrylic-Bound HALS Resin

Clear acrylic-melamine thermoset coating enamels were formulated by mixing the following ingredients:

(1) 48.60 parts acrylic-bound HALS #2 resin solution (50% by weight solids resin in Aromatic 100) from Example 2;
(2) 21.15 parts acrylic HSC resin solution (76.5% by weight solids resin in Aromatic 100) from Example 1;
(3) 13.50 parts Cymel 303 (hexamethoxymethylmelamine sold by American Cyanamid);
(4) 8.10 parts n-butanol;
(5) 8.10 parts DBE solvent (DiBasic Esters sold by E. I. DuPont); and
(6) 0.55 parts Cycat 4040 catalyst (40% p-toluene sulfonic acid in isopropanol sold by American Cyanamid).

The non-volatile matter (NVM) content of the formulation was 54.0% by weight. The concentration of HALS #2 in the formulation was 0.995% by weight binder (resin + melamine).

Ingredient 2 (acrylic HSC resin solution) was added to the formulation in order to achieve a desired concentration of HALS moiety (~1.0% by weight based on binder) in the coating enamel. The acrylic resin added acts as a diluent to the acrylic-bound HALS resin (ingredient 1).

The enamel formulation was applied by brush to untreated aluminum panels (Q-panels). The clear enamel was cured in a 140° C. oven for 20 minutes to yield a hard glossy finish. Dry film thickness was 1.0 to 1.5 mils. Pencil hardness was 2H. This was determined by the average of three panel measurements.

EXAMPLE 4

Accelerated Weathering of Acrylic-Bound HALS Clearcoat Enamel

This example illustrates the performance advantages of acrylic bound HALS of the present invention as compared to a conventional HALS additive in a clearcoat acrylic enamel application.

A QUV weathering tester made by Q Panel Company was used with an 8 hour 60° C. light cycle (UVB-3/3), and a 4 hour 50° C. wet cycle.

The enamels tested were:

[A] The acrylic-bound HALS clearcoat enamel from Example 3.
[B] A clear enamel prepared using Resin #1 of Example 1 containing no light stabilizer.
[C] A clear enamel prepared using Resin #1 of Example 1 and containing 1.0 % by weight (based on binder solids) Tinuvin 440, a hindered amine light stabilizer sold by Ciba-Geigy.

The results in Table 1 are reported in percent gloss retention (60°). A result of 100 is best. Visible cracking is noted (**) when observed.

TABLE 1

| | Gloss Retention and Crack Prevention | | |
|---|---|---|---|
| QUV Hours | [A] | [B] | [C] |
| 0 | 100 | 100 | 100 |
| 500 | 97 | 68 | 86 |
| 1100 | 64 | 30 | 55 |
| 1600 | 36 | ** | ** |
| 2100 | 22 | ** | ** |

Both Enamel [B] and Enamel [C] failed between 1100 and 1600 hours QUV, as both surfaces were cracked. However, Enamel [A] of the present invention containing acrylic-bound HALS resin, did not fail even after 2100 hours QUV. Furthermore, Enamel [A] possesses significantly higher gloss retention upon QUV weathering than either Enamel [B] or Enamel [C] containing Tinuvin 440, a conventional HALS additive. This demonstrates that improved coatings light stabilization can be realized by the use of the polymer bound light stabilizer resins of the present invention.

The results in Table 2 are reported in units of total color change (delta E) based on the CIELAB 1976 color scale ($L^*$, $a^*$, $b^*$). The lower the value the lower the degree of color formation.

TABLE 2

| | Total Color Change | | |
|---|---|---|---|
| QUV Hours | [A] | [B] | [C] |
| 0 | 0 | 0 | 0 |
| 500 | 1.5 | 2.9 | 5.1 |
| 1100 | 5.1 | 18.1 | 10.0 |
| 1600 | 13.6 | ** | ** |

As shown in Table 2, lower color change upon QUV weathering was obtained with Enamel [A] of the present invention as compared to either Enamel [B] or Enamel [C]. This further illustrates improved coatings weatherability with the use of the polymer bound light stabilizer resins of the present invention.

EXAMPLE 5

White Basecoat/Clearcoat Enamels Containing Acrylic-Bound HALS Resin

The clearcoat acrylic-bound HALS enamel formulation produced in Example 3 was applied by gravity drawdown to white ($TiO_2$) pigmented basecoat acrylic enamels.

The white basecoat acrylic enamels were supplied by Advanced Coatings Technologies Inc., Hillsdale, Mich. The panels supplied were phosphated automotive grade cold rolled steel that was epoxy primer coated (ECOAT ED-3150A) and base coated with a white TiO$_2$ pigmented acrylic enamel (UBC-8554).

The clear topcoat formulation containing acrylic-bound HALS resin on the white basecoat enamel was cured in a 140° C. oven for 30 minutes. This yielded a hard glossy finish. Dry film thickness of the clear topcoat was 1.0 to 1.5 mils. Pencil hardness was 2H. Gloss (60°) was 90 to 95. This was determined by the average of three panel measurements.

EXAMPLE 6

Accelerated Weathering of Acrylic-Bound HALS White Basecoat/Clearcoat Enamel

This example illustrates the performance advantages of acrylic bound HALS of the present invention as compared to a conventional HALS additive in a solid white basecoat/clearcoat acrylic enamel application.

The enamels tested were:

[D] The acrylic bound HALS white basecoat/clearcoat enamel from Example 5.

[E] A white basecoat/clearcoat enamel prepared using Resin #1 of Example 1 containing no light stabilizer.

[F] White basecoat/clearcoat enamel prepared using Resin #1 of Example 1 and containing 1.0% by weight (based on binder solids) Tinuvin 440 in the clearcoat.

QUV weathering was the same as in Example 4.

TABLE 3

| Gloss Retention and Crack Prevention | | | |
|---|---|---|---|
| QUV Hours | [D] | [E] | [F] |
| 500 | 100 | 100 | 100 |
| 1000 | 100 | **100 | 100 |
| 1500 | 100 | **92 | **93 |
| 2000 | 99 | **76 | **73 |
| 2500 | 95 | **47 | **50 |

Enamel [E] exhibited micro-cracking at film interior between 500 and 1000 hours QUV. Enamel [F], containing Tinuvin 440, exhibited micro-cracking at film interior between 1000 and 1500 hours QUV. However, no visible cracking was observed for Enamel [D] of the present invention, even after 2500 hours QUV weathering. Furthermore, Enamel [D] retained 95% of its initial gloss after 2500 hours QUV, whereas both Enamels [E] and [F] lost 50% of their initial gloss. This further illustrates the superior coatings weatherability and durability realized with the use of the polymer bound light stabilizers of the invention.

TABLE 4

| | Total Color Change | | |
|---|---|---|---|
| QUV Hours | [D] | [E] | [F] |
| 500 | 0.9 | 3.1 | 3.1 |
| 1000 | 1.2 | 3.6 | 3.4 |
| 1500 | 1.2 | 3.6 | 3.5 |
| 2000 | 1.3 | 3.4 | 3.6 |
| 2500 | 1.4 | 3.5 | 3.4 |

As shown in Table 4, lower color change upon QUV weathering was obtained with the polymer bound HALS basecoat/clearcoat acrylic enamel (Enamel [D]) as compared to either Enamel [E] or Enamel [F], the basecoat/clearcoat acrylic enamel containing Tinuvin 440. Improved coatings light stabilization is again evident with the use of the polymer bound light stabilizer resins of the present invention as shown above by less color fading with QUV time.

EXAMPLE 7

Anhydride containing Acrylic HSC Resin #2

The procedure was the same as that used in Example 1, except ethyl 3-ethoxypropionate (EEP) was used as the solvent in place of Aromatic 100. EEP solvent is sold by Eastman Chemicals.

The number-average molecular weight of the resin (Resin #2) produced was 3300. The solids content was 73.2% resin.

This resin was used to bind an ultraviolet light absorbing (UVA) hydrazide.

EXAMPLE 8

Acrylic-Bound UVA 2-Hydroxybenzophenone Resin

To 405 grams of the acrylic resin solution (Resin #2) prepared in Example 7 were added 110 grams of ethyl 3-ethoxypropionate (EEP) solvent and 8.63 grams (0.0302 moles) 2-hydroxybenzophenone hydrazide (UVA #1), (4-benzoyl-3-hydroxyphenoxy)acetyl hydrazide. The reaction conditions used were the same as described in Example 2.

This yielded a 64% solids resin containing 2.83% by weight UVA #1 on resin solids.

The acrylic bound 2-hydroxybenzophenone resin prepared showed a substantial increase in ultraviolet absorbance at both 254 nm and 313 nm as compared to Resin #2 of Example 7, containing no ultraviolet light absorber. This was determined by analysis of the ultraviolet absorbance of the isolated resin from solution in the liquid chromatograph (GPC) using the UV detector mode. This confirms that the 2-hydroxybenzophenone moiety was attached to the acrylic resin.

EXAMPLE 9

Clear Enamels containing Acrylic-Bound UVA Resin

Clear acrylic-melamine thermoset coating enamels were formulated by mixing the following ingredients:
(1) 68.60 parts acrylic-bound UVA #1 resin solution (64% by weight solids resin in EEP) from Example 8;
(2) 14.60 parts Cymel 303;
(3) 2.10 parts EEP solvent;
(4) 4.70 parts each of Aromatic 100 solvent, n-butanol, and DBE solvent; and
(5) 0.60 parts Cycat 4040 catalyst.

The NVM content of the formulation was 58.6% by weight. The concentration of UVA #1 in the formulation was 2.13% by weight binder.

The clearcoat application and bake schedule used were the same as described in Example 3. Initial film properties obtained were the same as those given in Example 3.

EXAMPLE 10

Accelerated Weathering of Acrylic-Bound UVA Clearcoat Enamel

This example illustrates the performance advantages of acrylic bound UVA of the present invention as compared to a conventional UVA additive in a clearcoat acrylic enamel application.

The enamels tested were:

[G] The acrylic-bound UVA clearcoat enamel of the present invention from Example 9.

[H] A clear enamel prepared using Resin #2 of Example 7 containing no light stabilizer.
[I] A clear enamel prepared using Resin #2 of Example 7 and containing 2.2% by weight (based on binder solids) Uvinul 408, a 2-hydroxybenzophenone ultraviolet light stabilizer sold by BASF Corp.

QUV weathering was the same as in Example 4.

TABLE 5

| | Gloss Retention | | |
|---|---|---|---|
| QUV hours | [G] | [H] | [I] |
| 0 | 100 | 100 | 100 |
| 750 | 93 | 76 | 93 |
| 1200 | 90 | 51 | 76 |
| 1600 | 67 | ** | 55 |

Enamel [H] failed between 1200 and 1600 hours QUV, surface was cracked. Enamel [G] of the present invention, did not fail even after 1600 hours QUV. Moreover, Enamel [G] exhibited significantly higher gloss retention upon QUV weathering than either Enamel [H] or Enamel [I] containing Uvinul 408. Table 5 demonstrates that improved coatings light stabilization is realized with the use of the polymer bound light stabilizer resin of the present invention.

TABLE 6

| | Total Color Change | |
|---|---|---|
| QUV hours | [G] | [I] |
| 1200 | 4.9 | 6.4 |
| 1600 | 16.4 | 21.0 |

As shown in Table 6, lower color change upon QUV weathering was obtained with the polymer bound UVA enamel (Enamel [G]) as compared to Enamel [I] containing Uvinul 408. Table 6 further demonstrates the performance advantage obtained by the use of the polymer bound ultraviolet light stabilizer of the invention in terms of color retention upon weathering.

EXAMPLE 11

Carboxyl containing Acrylic HSC Resin

A low molecular weight, acrylic high solids coating resin with both hydroxyl and carboxyl groups was produced using the following monomers: butyl acrylate/butyl methacrylate/2-hydroxyethyl acrylate/methyl methacrylate/styrene/methacrylic acid in weight ratios of 30.5/21/25/10/10/3.5.

The procedure was the same as that used in Example 1, except the monomer(s) to Aromatic 100 solvent ratio used was 1.85 to 1 by weight.

The number-average molecular weight of the resin (Resin #3) produced was 2100. The solids content was 61.9% resin.

This resin was used to bind a HALS hydrazide.

EXAMPLE 12

Acrylic-Bound HALS Resin

To 300 grams of the acrylic resin solution (Resin #3) prepared in Example 11 were added 100 grams of Aromatic 100 solvent and 5.00 grams (0.0207 moles) HALS #2, identified in Example 2. The reaction conditions used were the same as given in Example 2.

This yielded a 50% solids resin containing 2.62% by weight HALS #2 on resin solids. The percent attachment or degree of binding was determined to be 79% by weight.

EXAMPLE 13

Anhydride containing Acrylic HSC Resin

A low molecular weight, acrylic high solids coating resin with both hydroxyl and anhydride groups was produced using the following monomers: butyl acrylate/butyl methacrylate/2-hydroxyethyl acrylate/methyl methacrylate/styrene/maleic anhydride in weight ratios of 30.5/21/25/10/10/3.5.

The procedure was the same as that used in Example 1, except the monomer(s) to Aromatic 100 solvent ratio used was 2 to 1 by weight.

The number-average molecular weight of the resin (Resin #4) produced was 2000. The solids content was 65.9% resin.

This resin was used to bind an acetyl-substituted HALS hydrazide.

EXAMPLE 14

Acrylic-Bound HALS Resin

To 250 grams of the acrylic resin solution (Resin #4) prepared in Example 13 were added 20 grams of Aromatic 100 solvent and 4.10 grams (0.0144 moles) hindered amine light stabilizer hydrazide (HALS #3), N-(1-acetyl-2,2,6,6-tetramethylpiperidinyl)-N'-aminooxamide. The reaction conditions used were the same as described in Example 2.

This yielded a 64% solids resin containing 2.43% by weight HALS #3 on resin solids. The percent attachment or degree of binding was determined to be greater than 95% by weight. This was determined by quantitation of the residual amount of unreacted HALS #3 in the resin solution after reaction using reverse phase liquid chromatography (RPLC). The amount of residual unreacted HALS #3 was determined to be less than 5% by weight.

The analytical method used to determine the residual percent of HALS #3 unreacted ("free") in the acrylic resin solution is outlined in the Analytical Methods section set forth hereinafter.

EXAMPLE 15

Blue Metallic Basecoat/Clearcoat Enamels Containing Acrylic-Bound HALS Resin

Clear topcoat acrylic-melamine thermoset coating enamels were formulated by mixing the following ingredients:
(1) 33.23 parts acrylic-bound HALS #3 resin solution (64% by weight solids resin in Aromatic 100) from Example 14;
(2) 29.41 parts acrylic HSC resin solution (62% by weight solids resin in Aromatic 100) from Example 11;
(3) 13.16 parts Cymel 303
(4) 7.89 parts each of n-butanol, DBE solvent, and EEP solvent; and
(5) 0.53 parts Cycat 4040 catalyst.

The formulation was 52.6% NVM by weight. The concentration of HALS #3 in the formulation was 0.982% by weight binder.

The clearcoat acrylic-bound HALS #3 formulation produced was applied by gravity drawdown to light blue metallic pigmented basecoat acrylic enamels. The basecoat enamels were supplied by Advanced Coatings Technologies Inc., Hillsdale, Mich. The panels supplied were phosphated automotive grade cold rolled steel that was epoxy primer coated (ECOAT ED-3150A) and base coated with a light blue metallic pigmented acrylic enamel (DP 871-AC788).

Clearcoat bake schedule used was the same as described in Example 5. Initial film properties obtained are the same as those given in Example 5. Clear topcoat hardness (Knoops) was 8 to 9.

EXAMPLE 16

Accelerated Weathering of Acrylic-Bound HALS Blue Metallic Basecoat/Clearcoat Enamel This example illustrates the performance advantages of acrylic bound HALS of the present invention as compared to a conventional HALS additive in a blue metallic basecoat/clearcoat acrylic enamel.

The enamels tested were:

[J] The acrylic bound HALS blue metallic basecoat/clearcoat enamel from Example 15.

[K] A blue metallic basecoat/clearcoat enamel prepared using Resin #4 of Example 13 containing no light stabilizer.

[L] Blue metallic basecoat/clearcoat enamel prepared using Resin #4 of Example 13 and containing 1.50% by weight clearcoat binder Tinuvin 440.

QUV weathering was the same as in Example 4.

TABLE 7

| | Gloss Retention and Crack Prevention | | |
|---|---|---|---|
| QUV Hours | [J] | [K] | [L] |
| 500 | 100 | 100 | 100 |
| 1000 | 76 | **41 | 61 |
| 1500 | 30 | ** | **24 |

Enamel [K] exhibited micro-cracking at film interior between 500 and 1000 hours QUV. Enamel [L], containing Tinuvin 440, exhibited micro-cracking at film interior between 1000 and 1500 hours QUV. However, no visible cracking was observed for Enamel [J] of the present invention containing acrylic bound HALS resin, even after 1500 hours QUV weathering. Moreover, Enamel [J] possesses significantly higher gloss retention upon QUV weathering than either Enamel [K] or Enamel [L]. This demonstrates superior coatings weatherability with the use of the polymer bound light stabilizers of the present invention.

TABLE 8

| | Total Color Change | | |
|---|---|---|---|
| QUV Hours | [J] | [K] | [L] |
| 500 | 2.8 | 3.4 | 2.9 |
| 1000 | 6.0 | 6.5 | 6.3 |
| 1500 | 8.0 | ** | 8.3 |

As shown in Table 8, lower color change upon QUV weathering was also obtained with the polymer bound HALS basecoat/clearcoat acrylic enamel (Enamel [J]) as compared to either Enamel [K] or Enamel [L] containing Tinuvin 440.

EXAMPLE 17

Accelerated Weathering of Acrylic-Bound HALS/UVA White Basecoat/Clearcoat Enamel This example illustrates the performance advantages of the acrylic bound HALS of the present invention in combination with an ultraviolet light absorbing (UVA) stabilizer as compared to a conventional HALS/UVA additive combination.

The enamels tested were:

[M] The acrylic bound HALS white basecoat/clearcoat enamel from Example 5 containing 1.0% by weight clearcoat binder Tinuvin 900, a UVA stabilizer sold by Ciba-Geigy. Tinuvin 900 was blended/dissolved in the clearcoat acrylic-bound HALS enamel formulation produced in Example 3. This was then applied to white basecoat and cured as described in Example 5 to prepare enamel [M].

[N] White basecoat/clearcoat enamel prepared using Resin #1 of Example 1 and containing 1.0% by weight clearcoat binder each Tinuvin 440 and Tinuvin 900.

QUV weathering was the same as in Example 4.

TABLE 9

| | Gloss Retention and Crack Prevention | |
|---|---|---|
| QUV Hours | [M] | [N] |
| 500 | 100 | 100 |
| 1000 | 100 | 100 |
| 1000 | 100 | 98 |
| 2000 | 100 | **87 |
| 2500 | 100 | **60 |

Enamel [N], containing the combination of Tinuvin 440 and Tinuvin 900, exhibited micro-cracking at film interior between 1500 and 2000 hours QUV. However, no visible cracking was observed for Enamel [M] of the present invention containing acrylic bound HALS resin in combination with Tinuvin 900, even after 2500 hours QUV weathering. Furthermore, Enamel [M] retained 100% of its initial gloss after 2500 hours QUV, whereas Enamel [N] lost 40% of its initial gloss. This further demonstrates that superior coatings weatherability is realized using polymer bound light stabilizers of the present invention in combination with conventional light stabilizer additives.

TABLE 10

| | Total Color Change | |
|---|---|---|
| QUV Hours | [M] | [N] |
| 500 | 1.1 | 3.1 |
| 1000 | 1.9 | 4.0 |
| 1500 | 1.5 | 3.8 |
| 2000 | 1.5 | 3.7 |
| 2500 | 1.7 | 3.4 |

As shown in Table 10, lower color change upon QUV weathering was obtained with the polymer bound HALS combined with UVA basecoat/clearcoat acrylic enamel (Enamel [M]) as compared to Enamel [N], the basecoat/clearcoat acrylic enamel containing Tinuvin 440/Tinuvin 900. Improved coatings light stabilization as evident by less color fading with QUV time is illustrated with the use of the polymer bound light stabilizer resins of the invention.

EXAMPLE 18

This example describes a light stabilized acrylic resin of the present invention comprising an acrylic polymer containing both hydroxyl and epoxy reactive functional groups and a light stabilizer hydrazide.

A. Reactive Acrylic Resin

The procedure was the same as that used in Example 1, except the acrylic resin was produced using the following monomers: butyl acrylate/butyl methacrylate/2-hydroxyethyl acrylate/methyl methacrylate/styrene/glycidyl methacrylate in weight ratios of 30/20/25/10/10/5, and the ratio of the monomers to Aromatic 100 solvent was 2 to 1 by weight.

The number-average molecular weight of the resin (Resin #5) produced was 2000. The solids content was 63% resin.

B. Light stabilized Acrylic Resin

To 455 grams of the acrylic resin solution prepared in part A of this Example (Resin #5) were added 45 grams of Aromatic 100 solvent and 7.40 grams (0.0306 moles) HALS #2, from Example 2. The reaction conditions used were the same as in Example 2.

This yielded a 63% solids resin containing 2.50% by weight HALS #2 on resin solids. The percent attachment or degree of binding was determined to be 71% by weight.

EXAMPLE 19

This example illustrates the improved weathering performance obtained with the use of light stabilized acrylic resin of the present invention as compared to conventional light stabilizer in two-component acrylic urethane thermoset coatings.

A. Reactive Acrylic Resin:

The procedure was the same as used in Example 1, except the acrylic resin was produced using the following monomers: butyl acrylate/butyl methacrylate/2-hydroxyethyl acrylate/styrene/maleic anhydride in weight rations of 25/40/25/7.5/2.5 (825 grams); the initiator used was 4.0 PHM pure basis Lupersol 555-M60, a 60% solution of t-amylperoxy acetate in odorless mineral spirits sold by the Lucidol Division of Pennwalt Corporation; the polymerization temperature was 135° C.; and the monomers and initiator were metered at a rate of 160 grams/hour.

The number-average molecular weight of the resin (Resin #6) produced was 2700. The solids content was 73% resin.

B. Light stabilized Acrylic Resin:

To 277 grams of the acrylic resin solution prepared (Resin #6) were added 48 grams of Aromatic 100 solvent and 4.07 grams (0.0168 moles) HALS #2, from Example 2. The reaction conditions used are the same as described in Example 2, except the reaction temperature used was 135° C.

This yielded a 66% solids resin containing 1.97% by weight HALS #2 on resin solids. The percent attachment or degree of binding was determined to be 86% by weight.

C. Urethane Coatings containing Light Stabilized Acrylic Resin

Clear acrylic urethane thermoset coating enamels were formulated by mixing the following ingredients:
(1) 42.37 parts light stabilized acrylic resin solution (66% by weight acrylic-bound HALS #2 resin in Aromatic 100);
(2) 14.77 parts acrylic resin solution (Resin #6);
(3) 16.27 parts Desmodur N-3300 (aliphatic polyisocyanate resin sold by Mobay/Bayer); and
(4) 8.87 parts each methyl ketone, DBE solvent, and EEP solvent.

The NVM content of the formulation was by weight. The concentration of HALS #2 in the formulation was 1.0% by weight binder.

White basecoat/clearcoat enamels were prepared the same as described in Example 5, except the clear acrylic urethane topcoat formulation containing acrylic-bound HALS resin on the white basecoat enamel was cured in a 100° C. oven for 30 minutes. Initial film properties obtained are the same as those given in Example 5.

D. Accelerated Weathering of Urethane Coatings Containing Light stabilized Acrylic Resin:

The enamels tested were:
[O] The acrylic bound HALS white basecoat/clearcoat urethane enamel prepared using Resin #6.
[P] A white basecoat/clearcoat urethane enamel prepared using Resin #6 containing no light stabilizer.
[Q] White basecoat/clearcoat urethane enamel prepared using Resin #6 and containing 1.0% by weight (based on binder solids) Tinuvin 440 in the clearcoat.

QUV weathering was the same as in Example 4.

TABLE 11

| QUV Hours | 60° Gloss | | |
|---|---|---|---|
| | [O] | [P] | [Q] |
| 500 | 91 | 91 | 90 |
| 1000 | 90 | **88 | **90 |
| 1500 | 90 | **87 | **90 |
| 2000 | 90 | **84 | **83 |

Enamels [P] and [Q] exhibited clearcoat pitting between 500 and 1000 hours QUV. However, no pitting of film surface was observed for Enamel [Q] of the present invention containing acrylic bound HALS resin, even after 2000 hours QUV weathering. Furthermore, Enamel [Q] of the present invention retained essentially 100% of its initial gloss after 2000 hours QUV, whereas both Enamels [P] and [Q] have lost gloss.

This example further illustrates the improved weathering performance provided in acrylic thermoset coatings with the use of light stabilized acrylic resin of the present invention.

ANALYTICAL METHODS

METHOD I: Determination of Percent Attachment of HALS Hydrazide (HALS #2) to Acrylic Resin Method Summary: The acrylic resin sample containing the attached HALS #2 is separated from low molecular weight species using a semi-preparative 500 A° gel permeation chromatographic (GPC) column. The isolated resin is then titrated for total HALS content using a HCl in methanol titrant and glass-calomel pH electrode.

Part A. Isolation of the high molecular weight polymeric fraction by semi-preparative size exclusion chromatography Apparatus (1) liquid chromatograph (LC), capable of delivering flow rates of 8 ml./min. and pressures of 1000 psi.;
(2) column, Waters Styragel 500 A° column, 122 cm.×21.4 mm. ID,
(3) detector, refractive index (RI), attentuation adjusted to achieve full scale deflection for the polymer peak, with output to strip chart recorder;
(4) mobile phase, chloroform (ACS grade);
(5) constant volume injection value, equipped with an 8 ml. sample loop;

(6) 3-port collection value, capable of diverting column effluent to collection vessel, waste, and recycle; and (7) filtration disc assembly, 0.45 micron.

Procedure

Step 1: Prepare sample for injection to LC column. This is accomplished by diluting 10 grams of the polymer (correcting for the solids content of the acrylic resin solution) with 50 ml. chloroform.

Step 2: Sample fractionation. Inject 8 ml. of sample into LC sample loop/column. Collect high molecular weight (MW) fraction, polymer peak, in a round bottom flask.

Step 3: Using a roto-evaporator stripper, evaporate off the chloroform in the high MW fraction collected.

Step 4: Repeat steps 2 and 3 until ~8 grams of high MW fraction (polymer) has been collected. Record amount of isolated polymer. Determine amount of residual chloroform in the polymer matrix by gas chromatography (GC).

Part B. Determination of HALS content of polymer

Apparatus (1) Automatic Recording Titration system equipped with a glass-calomel pH electrode.

Procedure

Step 1: Add 35 ml. methanol to the round bottom flask containing the known amount of isolated high MW fraction (i.e. isolated polymer). Mix well until complete dissolution.

Step 2: Transfer 10 ml. of the polymermethanol solution to a glass beaker. Add an additional 150 ml. of methanol.

Step 3: Titrate with 0.005N HCl using the milli-volt scale.

Step 4: Calculate amount of high MW fraction being titrated.

Calculation 1

$$\text{Amount} = \frac{(\text{grams of resin isolated})(100 - \% \text{ chloroform in resin})(10 \text{ ml})}{(35 \text{ ml})}$$

Step 5: Calculate % HALS (2,2,6,6-tetramethylpiperidine) on the resin.

Calculation 2

$$\% \text{ HALS} = \frac{(\text{ml. titrated})(\text{N of HCl in methanol})(140.25 \text{ g/mole})}{(\text{amount from calculation 1.})(10)}$$

METHOD II: Determination of Residual Percent of Acetyl-HALS Hydrazide (HALS #3) in Acrylic Resin Solution Method summary: The acrylic resin sample containing the attached HALS #3 is diluted in acetonitrile and chromatographed by Reverse Phase Liquid Chromatography (RPLC). The residual ("free") amount of unreacted HALS #3 is determined by comparison of retention time and response factors of a standard solution of HALS #3.

Apparatus (1) high performance liquid chromatograph (HPLC), with gradient elution capability, 1 ml./min. flow rate;

(2) column, Spherisorb ODS-2 column, 150×4.6 mm., 5 micron;

(3) detector, variable wavelength U.V. detector set at 230 nm.;

(4) mobile phase, initial: 10% acetonitrile/90% water, final: 50% acetonitrile/50% water at 10 minutes linear gradient;

(5) constant volume injector equipped with a 5 microliter sample loop;

(7) filter disc assembly, 0.45 micron.

Part A. Analysis

Procedure

Step 1: Prepare HALS #3 standard solution Dilute 40 mg. of known purity HALS #3 with 50 ml. acetonitrile. Transfer 50 micro-liters into a 10 ml. volumetric flask and further dilute with acetonitrile.

Step 2: Prepare sample. This is accomplished by diluting 200 mg. of the acrylic resin solution containing the attached HALS #3 (and residual HALS #3) with 25 ml. acetonitrile.

Step 3: Inject 1 ml. of the HALS #3 standard solution into HPLC loop/column. Determine area counts of the HALS #3 standard peak. The peak of interest should elute at ~7.5 mins.

Step 4: Inject 1 ml. of the sample solution into HPLC loop/column. Determine area counts of the residual HALS #3 peak in the sample.

Part B. Determination of residual HALS #3 content of sample

Calculation 3.

$$\text{Percent HALS \#3} = \frac{A \times B \times C}{D \times E}$$

where:

A = concentration of the HALS #3 in the standard solution (i.e. A = 0.0040 mg/ml);

B = area counts of the HALS #3 in the sample solution scan;

C = percent purity of the HALS #3 standard used;

D = area counts of the HALS #3 in the standard solution scan;

E = concentration of the sample solution (i.e. E = 8.00 mg/ml).

The present invention may be embodied in other specific forms without departing from the spirit or essential attributes thereof and, accordingly, reference should be made to the appended claims, rather than to the foregoing specification as indicating the scope of the invention.

We claim:

1. A light stabilized acrylic resin comprising the reaction product of an acrylic prepolymer having at least first and second types of reactive functional groups, the first type of reactive functional group being a hydroxyalkyl ester group, the second type of reactive functional group being a carboxyl group, an anhydride group, an epoxy group or an isocyanate group, and at least one light stabilizer having a reactive hydrazido group, the light stabilizer being 2,2,6,6-tetraalkylpiperidine hydrazide, 2-(2-hydroxyphenyl)-2H-benzotriazole hydrazide, 2-hydroxybenzophenone hydrazide, aryl salicylate hydrazide or oxanilide hydrazide, the reactive hydrazido group having a formula

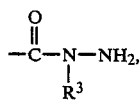

in which $R^3$ is hydrogen, primary alkyl of 1 to 8 carbons, secondary alkyl of 3 to 8 carbons, aralkyl of 7 to 12 carbons or cycloalkyl of 5 to 12 carbons.

2. A light stabilized acrylic resin according to claim 1 wherein the light stabilizer is a compound of the formula:

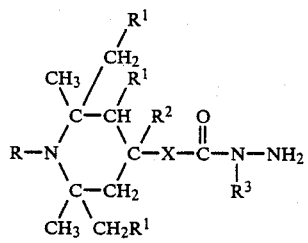

wherein:

R is hydrogen, oxyl, hydroxyl, alkyl of 1 to 20 carbons, alkenyl of 3 to 8 carbons, alkynyl of 3 to 8 carbons, aralkyl of 7 to 12 carbons, aliphatic acyl of 1 to 10 carbons, aromatic acyl of 7 to 13 carbons, alkoxycarbonyl of 2 to 9 carbons, aryloxycarbonyl of 7 to 15 carbons, alkyl carbamoyl of 2 to 19 carbons, aryl carbamoyl of 7 to 11 carbons, cycloalkyl carbamoyl of 6 to 13 carbons, aralkyl carbamoyl of 8 to 19 carbons, 2-cyanoethyl, hydroxyalkyl of 1 to 6 carbons, epoxyalkyl of 3 to 10 carbons or polyalkylene oxide of 4 to 30 carbons;

$R^1$ is hydrogen or lower alkyl of 1 to 4 carbons;

$R^2$ is hydrogen, hydroxyl, or alkoxy of 1 to 4 carbons;

when $R^2$ is hydrogen, X is a divalent radical —Z—$R^4$—, —$R^4$—or —Z—C(=O)—$R^5$—, and Z is —O—or —N($R^6$)—;

when $R^2$ is hydroxyl or alkoxy, X is a direct bond or an alkylene diradical of 1 to 4 carbons;

$R^3$ is hydrogen, primary alkyl of 1 to 8 carbons, secondary alkyl of 3 to 8 carbons, aralkyl of 7 to 12 carbons or cycloalkyl of 5 to 12 carbons;

$R^4$ is an alkylene diradical of 1 to 4 carbons;

$R^5$ is a direct bond, an alkylene diradical of 1 to 14 carbons, an alkenylene diradical of 2 to 10 carbons, an oxydialkylene diradical of 2 to 10 carbons, an azadialkylene diradical of 2 to 10 carbons, an o-, m-, p-phenylene diradical or a substituted phenylene diradical where the substituent is lower alkyl of 1 to 4 carbons, lower alkoxy of 1 to 4 carbons or hydroxy; and $R^6$ is hydrogen, alkyl of 1 to 10 carbons, cycloalkyl of 5 to 10 carbons, aralkyl of 7 to 12 carbons, aryl of 6 to 12 carbons, 2-cyanoethyl or a radical of the formula:

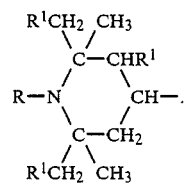

3. A light stabilized acrylic resin according to claim 1 wherein the light stabilizer is a compound of the formula:

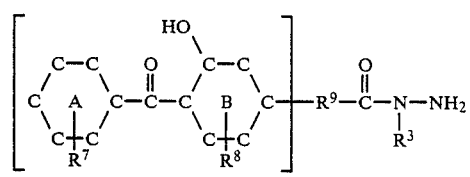

wherein:

$R^3$ is hydrogen, primary alkyl of 1 to 8 carbons, secondary alkyl of 3 to 8 carbons, aralkyl of 7 to 12 carbons or cycloalkyl of 5 to 12 carbons;

$R^7$ and $R^8$ independently are hydrogen, hydroxyl, alkyl of 1 to 8 carbons or alkoxy of 1 to 4 carbons;

$R^9$ is a direct bond or a divalent radical —O—(CH$_2$)$_b$—or —N($R^{10}$)—C(=O)—$R^5$—, in which b is 1 or 2, where $R^9$ may be connected to either aromatic ring A or B;

$R^5$ is a direct bond, an alkylene diradical of 1 to 14 carbons, an alkenylene diradical of 2 to 10 carbons, an oxydialkylene diradical of 2 to 10 carbons, an azadialkylene diradical of 2 to 10 carbons, an o-, m-, p-phenylene diradical or a substituted phenylene diradical where the substituent is lower alkyl of 1 to 4 carbons, lower alkoxy of 1 to 4 carbons or hydroxy; and $R^{10}$ is hydrogen, alkyl of 1 to 10 carbons, aralkyl of 7 to 12 carbons, cycloalkyl of 5 to 12 carbons or 2-cyanoethyl;

with optional substituents for the aromatic rings A and B comprising one or more of hydroxyl, alkyl of 1 to 8 carbons or alkoxy of 1 to 4 carbons.

4. A light stabilized acrylic resin according to claim 1 wherein the light stabilizer is a compound of the formula

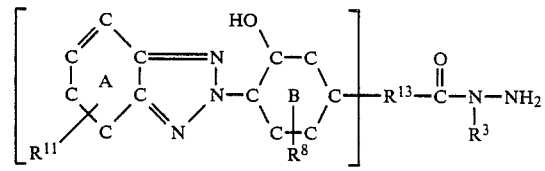

wherein:

$R^3$ is hydrogen, primary alkyl of 1 to 8 carbons, secondary alkyl of 3 to 8 carbons, aralkyl of 7 to 12 carbons or cycloalkyl of 5 to 12 carbons;

$R^{11}$ is hydrogen, alkyl of 1 to 4 carbons, chloro, alkoxy of 1 to 4 carbons, carboxyl, alkoxycarbonyl of 2 to 11 carbons or carboxylic acid amide;

$R^{12}$ is hydrogen, alkyl of 1 to 8 carbons, aralkyl of 7 to 12 carbons or aryl of 6 to 14 carbons;

$R^{13}$ is a direct bond or a divalent radical selected from —(CH$_2$)—NH—C(=O)—R$^5$—, —(CH$_2$)—NH—(CH$_2$)$_b$—, or —O—(CH$_2$)$_b$—, wherein b is 1 or 2 and where $R^{13}$ may be connected to either aromatic ring A or B; and $R^5$ is a direct bond, an alkylene diradical of 1 to 14 carbons, an alkenylene diradical of 2 to 10 carbons, an oxydialkylene diradical of 2 to 10 carbons, an azadialkylene diradical of 2 to 10 carbons, an o-, m-, p-phenylene diradical or a substituted phenylene diradical where the substitutent is lower alkyl of 1 to 4 carbons, lower alkoxy of 1 to 4 carbons or hydroxy;

with optional substituents for aromatic rings A and B comprising alkyl of 1 to 8 carbons, aralkyl of 7 to 12 carbons or alkoxy of 1 to 8 carbons.

5. A light stabilized acrylic resin according to claim 1 wherein the light stabilizer is a compound of the formula:

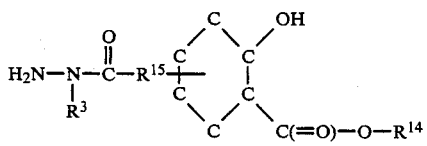

wherein:

$R^3$ is hydrogen, primary alkyl of 1 to 8 carbons, secondary alkyl of 3 to 8 carbons, aralkyl of 7 to 12 carbons or cycloalkyl of 5 to 12 carbons;

$R^{14}$ is aryl or substituted aryl of 6 to 10 carbons, where the substituents are lower alkyl of 1 to 4 carbons, lower alkoxy of 1 to 4 carbons or hydroxy; and $R^{15}$ is a direct bond, an alkylene diradical of 1 to 4 carbons, or a divalent radical —R$^5$—C(=O)—NH— or —(CH$_2$)$_b$—Z—, in which b is 1 or 2 and Z is —O— or —N(R$^6$)—;

$R^5$ is a direct bond, an alkylene diradical of 1 to 14 carbons, an alkenylene diradical of 2 to 10 carbons, an oxydialkylene diradical of 2 to 20 carbons, an azadialkylene diradical of 2 to 10 carbons, an o-, m-, p-phenylene diradical or a substituted phenylene diradical where the substituent is lower alkyl of 1 to 4 carbons, lower alkoxy of 1 to 4 carbons or hydroxy; and $R^6$ is hydrogen, alkyl of 1 to 10 carbons, cycloalkyl of 5 to 10 carbons, aralkyl of 7 to 12 carbons, aryl of 6 to 12 carbons, 2-cyanoethyl or a radical of the formula:

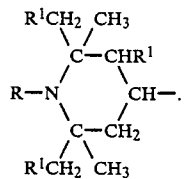

6. A light stabilized acrylic resin according to claim 1 wherein the light stabilizer is a compound of the formula:

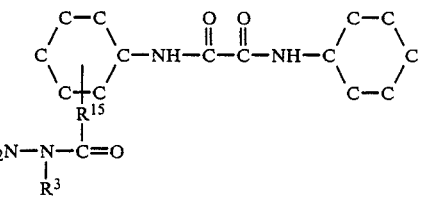

wherein:

$R^3$ is hydrogen, primary alkyl of 1 to 8 carbons, secondary alkyl of 3 to 8 carbons, aralkyl of 7 to 12 carbons or cycloalkyl of 5 to 12 carbons;

$R^{15}$ is a direct bond, an alkylene diradical of 1 to 4 carbons, or a divalent radical —R$^5$—C(=O)—NH— or —(CH$_2$)$_b$—Z—, in which b is 1 or 2 and Z is —O-13 or —N(R$^6$)—;

$R^5$ is a direct bond, an alkylene diradical of 1 to 14 carbons, an alkenylene diradical of 2 to 10 carbons, an oxydialkylene diradical of 2 to 10 carbons, an azadialkyelene diradical of 2 to 10 carbons, an o-, m-, p-phenylene diradical or a substituted phenylene diradical where the substituent is lower alkyl of 1 to 4 carbons, lower alkoxy of 1 to 4 carbons or hydroxy; and $R^6$ is hydrogen, alkyl of 1 to 10 carbons, cycloalkyl of 5 to 10 carbons, aralkyl of 7 to 12 carbons, aryl of 6 to 12 carbons, 2-cyanoethyl or a radical of the formula:

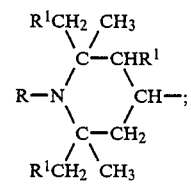

with optional substituents for the aromatic nucleii independently being hydroxyl, alkyl of 1 to 8 carbons, aralkyl of 7 to 13 carbons, aryl of 6 to 12 carbons, alkaryl of 7 to 13 carbons, alkoxy of 1 to 12 carbons, acyloxy of 2 to 12 carbons or alkoxycarbonyl of 2 to 8 carbons.

7. A light stabilized acrylic resin according to claim 1 wherein the acrylic prepolymer comprises about 10 to about 80 weight percent unbranched or branched alkyl acrylate, unbranched or branched alkyl methacrylate or mixtures thereof, wherein the alkyl group is an unsubstituted or substituted alkyl of 1 to 18 carbons, where the substituents are alkoxy of 1 to 4 carbons, chloro, phenyl or dialkylamino of 2 to 4 carbons; about 15 to about 50 weight percent hydroxyalkyl methacrylate, hydroxyalkyl acrylate or mixtures thereof, wherein the alkyl portion of the hydroxyalkyl acrylate or hydroxyalkyl methacrylate is unsubstituted or substituted alkyl of 2 to 8 carbons, where the substituents are alkyl of 1 to 4 carbons, alkoxy of 1 to 4 carbons, chloro or hydroxyl; about 0 to about 50 weight percent styrene; and up to about 10 weight percent of any of maleic anhydride, acrylic acid, methacrylic acid, 5-norbornene-2,3-dicarboxylic anhydride, glycidyl acrylate, glycidyl methacrylate, isocyanatoethyl acrylate or isocyanatoethyl methacrylate, or mixtures thereof.

8. An acrylic lacquer coating composition comprising a light stabilized acrylic resin according to claim 1 and a solvent for the light stabilized acrylic resin.

9. A thermosetting acrylic enamel coating composition comprising a light stabilized acrylic resin according to claim 1, a crosslinking agent and an organic solvent for the light stabilized acrylic resin and the crosslinking agent.

* * * * *

UNITED STATES PATENT AND TRADEMARK OFFICE
CERTIFICATE OF CORRECTION

PATENT NO. : 4,927,891

DATED : May 22, 1990

INVENTOR(S) : Vasanth R. Kamath et al.

It is certified that error appears in the above-identified patent and that said Letters Patent is hereby corrected as shown below:

In the Specification:

In column 6, lines 11 through 19 amend the formula to read as follows:

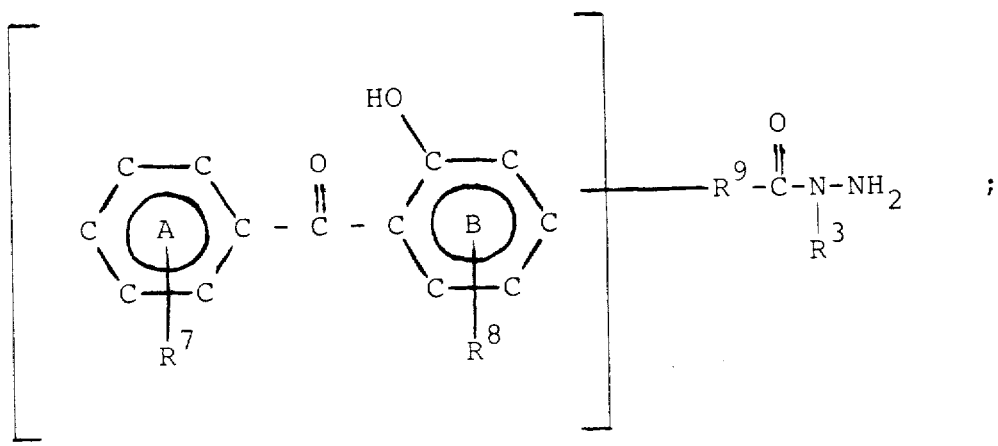

UNITED STATES PATENT AND TRADEMARK OFFICE
CERTIFICATE OF CORRECTION

PATENT NO. : 4,927,891

DATED : May 22, 1990

INVENTOR(S) : Vasanth R. Kamath et al.

It is certified that error appears in the above-identified patent and that said Letters Patent is hereby corrected as shown below:

In column 6, lines 51 through 59, amend the formula to read as follows:

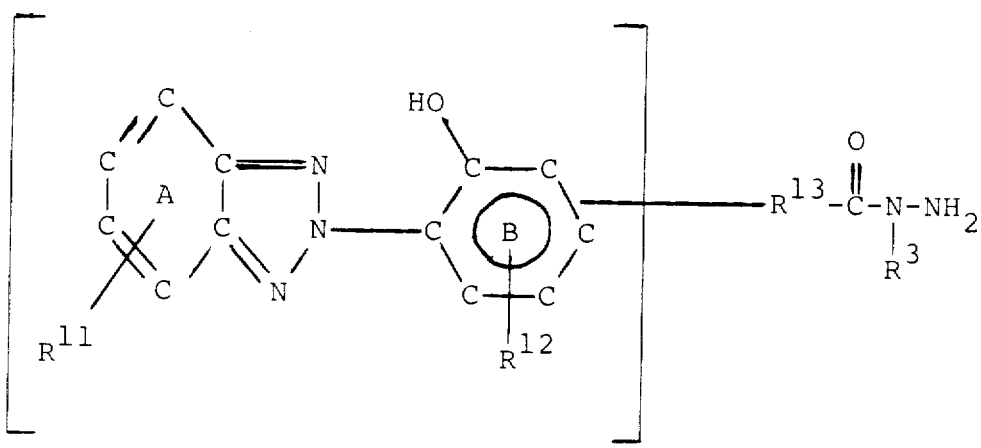

UNITED STATES PATENT AND TRADEMARK OFFICE
CERTIFICATE OF CORRECTION

PATENT NO. : 4,927,891                                      Page 3 of 6

DATED : May 22, 1990

INVENTOR(S) : Vasanth R. Kamath et al.

It is certified that error appears in the above-identified patent and that said Letters Patent is hereby corrected as shown below:

In the Claims:

In claim 3, at column 26, lines 15 through 22, amend the formula to read as follows:

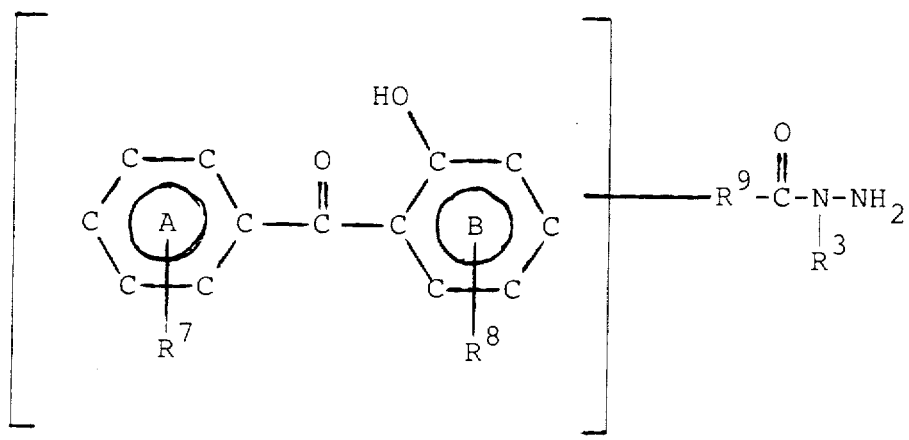

UNITED STATES PATENT AND TRADEMARK OFFICE
CERTIFICATE OF CORRECTION

PATENT NO. : 4,927,891
DATED : May 22, 1990
INVENTOR(S) : Vasanth R. Kamath et al.

It is certified that error appears in the above-identified patent and that said Letters Patent is hereby corrected as shown below:

In claim 4, at column 26, lines 51 through 59, amend the formula to read as follows:

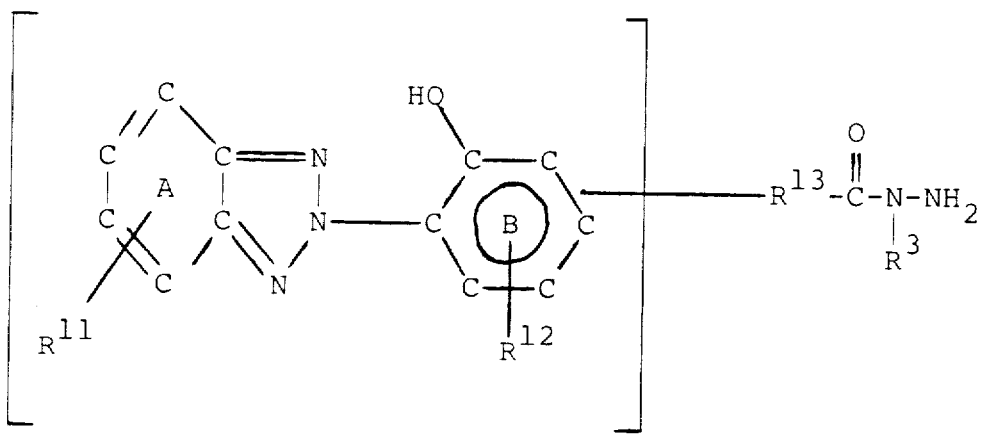

UNITED STATES PATENT AND TRADEMARK OFFICE
CERTIFICATE OF CORRECTION

PATENT NO. : 4,927,891

DATED : May 22, 1990

INVENTOR(S) : Vasanth R. Kamath et al.

It is certified that error appears in the above-identified patent and that said Letters Patent is hereby corrected as shown below:

In claim 5, at column 27, lines 22 through 29, amend the formula to read as follows:

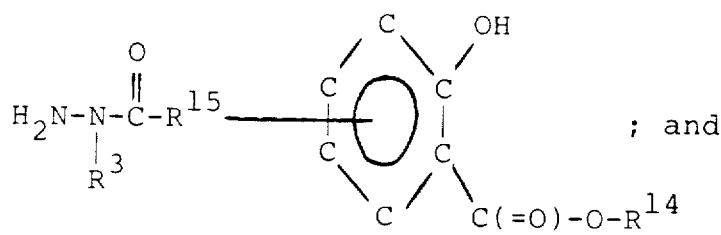

; and line 45, change "20" to --10--.

UNITED STATES PATENT AND TRADEMARK OFFICE
CERTIFICATE OF CORRECTION

PATENT NO. : 4,927,891

DATED : May 22, 1990

INVENTOR(S) : Vasanth R. Kamath et al.

It is certified that error appears in the above-identified patent and that said Letters Patent is hereby corrected as shown below:

In claim 6, at column 28, lines 1 through 9, amend the formula to read as follows:

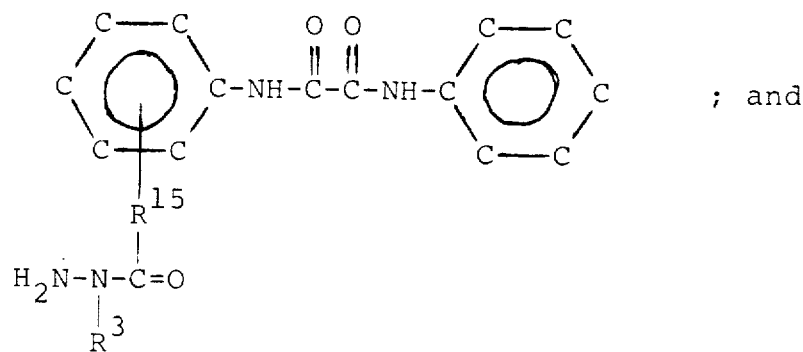 ; and line 17, change "-O-13" to ---O---.

Signed and Sealed this

Twentieth Day of August, 1991

*Attest:*

*Attesting Officer*

HARRY F. MANBECK, JR.

*Commissioner of Patents and Trademarks*